United States Patent
Mori et al.

(10) Patent No.: US 8,964,573 B2
(45) Date of Patent: Feb. 24, 2015

(54) WIRELESS NETWORK PATH SETTING APPARATUS AND METHOD

(75) Inventors: Hiroshi Mori, Tokyo (JP); Hideki Umemoto, Tokyo (JP); Yasuyuki Nakamoto, Tokyo (JP); Toshiyuki Emori, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 297 days.

(21) Appl. No.: 13/223,916

(22) Filed: Sep. 1, 2011

(65) Prior Publication Data
US 2012/0063330 A1 Mar. 15, 2012

(30) Foreign Application Priority Data
Sep. 3, 2010 (JP) .................. 2010-197589

(51) Int. Cl.
H04L 12/26 (2006.01)
H04W 40/22 (2009.01)
H04L 12/24 (2006.01)
H04L 12/717 (2013.01)

(52) U.S. Cl.
CPC ............... *H04W 40/22* (2013.01); *H04L 41/12* (2013.01); *H04L 45/42* (2013.01)
USPC ........... 370/248; 370/238; 370/312; 370/225; 370/235; 370/328; 370/250

(58) Field of Classification Search
USPC .......... 370/248, 238, 312, 225, 328, 235, 250
See application file for complete search history.

(56) References Cited

U.S. PATENT DOCUMENTS

| | | | |
|---|---|---|---|
| 2003/0108034 A1* | 6/2003 | Yu ................................ | 370/352 |
| 2004/0203405 A1* | 10/2004 | Reial et al. ..................... | 455/65 |
| 2007/0025353 A1* | 2/2007 | Nambisan et al. ............. | 370/392 |
| 2007/0189191 A1* | 8/2007 | Ades .............................. | 370/254 |
| 2007/0263572 A1* | 11/2007 | Ren et al. ....................... | 370/338 |
| 2008/0222614 A1* | 9/2008 | Chilimbi et al. .............. | 717/130 |
| 2009/0003251 A1* | 1/2009 | Imae .............................. | 370/310 |
| 2009/0059814 A1 | 3/2009 | Nixon et al. | |
| 2010/0061352 A1* | 3/2010 | Fasolo et al. ................... | 370/338 |
| 2010/0091660 A1* | 4/2010 | Morita ........................... | 370/241 |
| 2010/0149997 A1 | 6/2010 | Law et al. | |
| 2010/0157846 A1* | 6/2010 | Cooper et al. ................. | 370/254 |
| 2011/0158098 A1* | 6/2011 | Daraiseh et al. .............. | 370/235 |
| 2011/0164518 A1* | 7/2011 | Daraiseh et al. .............. | 370/252 |

(Continued)

FOREIGN PATENT DOCUMENTS

JP 2006-318148 A 11/2006

OTHER PUBLICATIONS

Communication dated Dec. 1, 2011 from the European Patent Office in counterpart European application No. 11179805.4.

*Primary Examiner* — Khaled Kassim
(74) *Attorney, Agent, or Firm* — Sughrue Mion, PLLC

(57) ABSTRACT

A wireless network path setting apparatus includes a receiving module configured to receive input of wireless network paths, an investigating module configured to investigate a communication environment and status of each of routes constituting the wireless network paths that have been input through the receiving module, and a registering module configured to register the wireless network paths that have been input through the receiving module as network paths to be used in a field wireless system if the communication environment and status of each route investigated by the investigating module is appropriate.

7 Claims, 3 Drawing Sheets

(56) References Cited

U.S. PATENT DOCUMENTS

2012/0185229 A1* 7/2012 Perrett .......................... 703/13
2012/0303788 A1* 11/2012 Heinrich et al. .............. 709/223
2013/0077477 A1* 3/2013 Daraiseh et al. ............. 370/225

* cited by examiner

WIRELESS NETWORK PATH SETTING APPARATUS AND METHOD

TECHNICAL FIELD

The present invention relates to a wireless network path setting apparatus and method for setting wireless network paths in a field wireless system.

RELATED ART

Usually, network paths of a field wireless system are generated dynamically by a system manager which is defined by the ISA100.11a standard. Detailed specifications of a method for generating network paths are not prescribed in the standard, and an implementing party determines a necessary algorithm. For example, an algorithm is such as to generate a network on the basis of such parameters as radio wave intensities indicating states of communication between adjoining devices. In this case, a backbone router (BBR) which is an access point of field devices is located at a level-0 layer and then levels (level 1, 2, . . . ) of the field devices are determined according to the number of hops. The field devices can have one or both of I/O ability and router capability. The backbone router can establish a communication route with a device having I/O ability via a device having router capability. A communication route can also be established between, for example, devices at the same level if one of them has route capability. This serves to give redundancy to network paths.

In such network paths, the communication response time can be made shorter as the number of levels (the number of hops) decreases. On the other hand, although the redundancy of network paths is effective in increasing their reliability, an unduly high degree of redundancy may cause increase in traffic, elongation of communication response times, or an unexpected degree of exhaustion of batteries.

PRIOR ART DOCUMENTS

Patent Documents

[Patent document 1] JP-A-2006-318148

Where network paths are generated according to an algorithm in the above-described manner, the level of each field device (e.g., the number of hops from the backbone router) becomes indefinite. Since the response time varies depending on the number of hops, the situation that network paths are not determined uniquely is not preferable for a control loop in which response times should be determined strictly. Although the redundancy of network paths is effective in increasing their reliability in that continuation of a communication is secured, the same problem as mentioned above occurs when it is applied to a control loop because likewise the number of hops is not determined uniquely.

SUMMARY

Exemplary embodiments of the present invention provide a wireless network path setting apparatus and method capable of determining network paths uniquely.

A wireless network path setting apparatus according to an exemplary embodiment, includes:
a receiving module configured to receive input of wireless network paths;
an investigating module configured to investigate a communication environment and status of each of routes constituting the wireless network paths that have been input through the receiving module; and
a registering module configured to register the wireless network paths that have been input through the receiving module as network paths to be used in a field wireless system if the communication environment and status of each route investigated by the investigating module is appropriate.

The investigating module may be configured to investigate the communication environment and status of each route on the basis of information stored in advance and indicating the communication environments and statuses of the respective routes.

The investigating module may be configured to investigate the communication environment and status of each route on the basis of a result of a trial communication.

The wireless network paths may have a layered structure.

The wireless network paths may constitute a control loop.

A wireless network path setting method according to an exemplary embodiment, includes:
receiving input of wireless network paths;
investigating a communication environment and status of each of routes constituting the wireless network paths that have been input; and
registering the wireless network paths that have been input as network paths to be used in a field wireless system if the communication environment and status of each route investigated is appropriate.

In the wireless network path setting apparatus according to the embodiment, input wireless network paths are registered as network paths to be used in a field wireless system if the communication environment and status of each route is investigated as appropriate. Therefore, network paths can be determined uniquely.

In the wireless network path setting method according to the embodiment, input wireless network paths are registered as network paths to be used in a field wireless system if the communication environment and status of each route is investigated as appropriate. Therefore, network paths can be determined uniquely.

DETAILED DESCRIPTION

An embodiment in which a network path setting apparatus according to the present invention is applied to a field wireless system will be described below.

Figure 1:
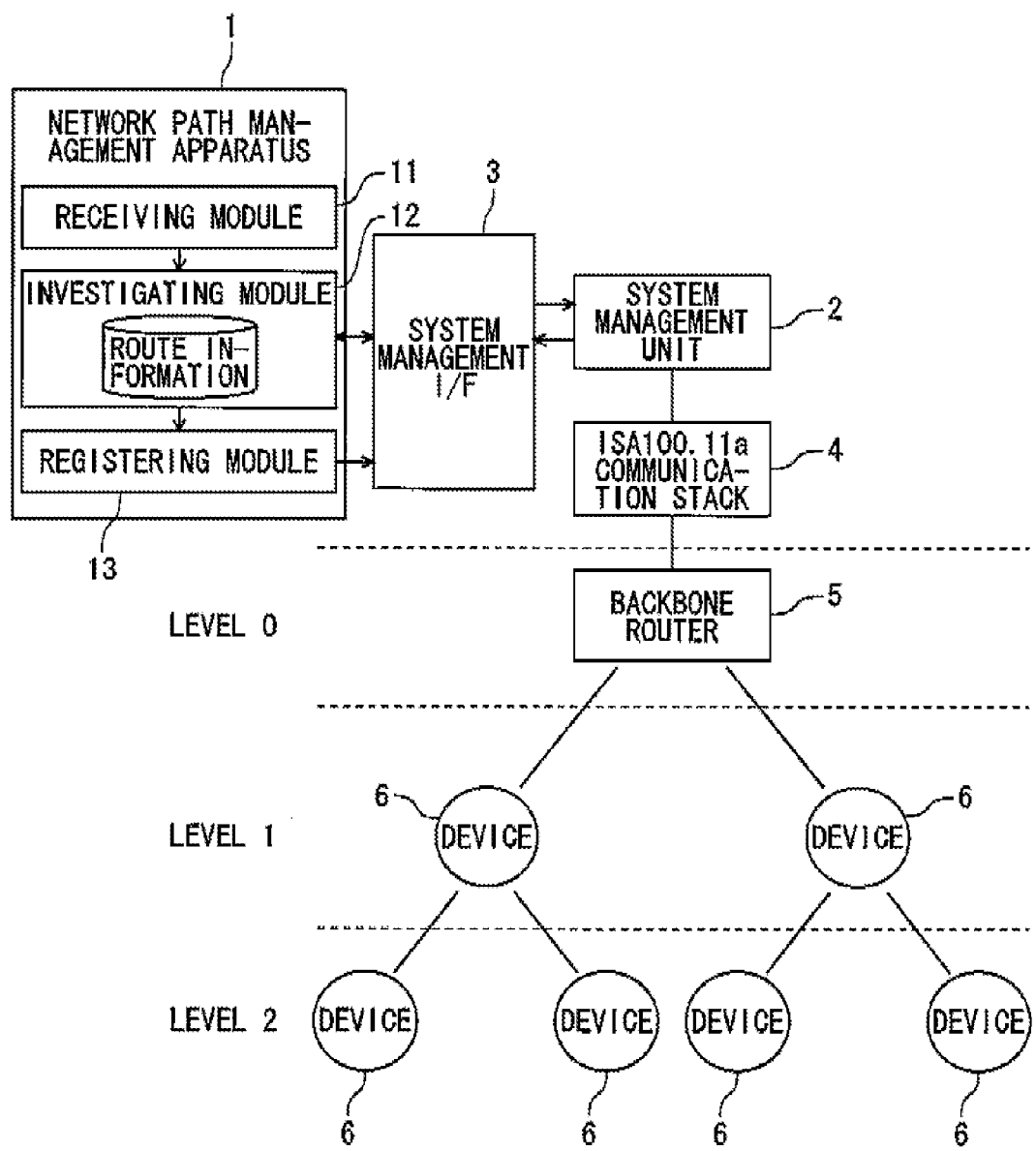
FIG. 1 is a block diagram showing the configuration of a network path setting apparatus according to an embodiment.

FIG. 1 is a block diagram showing the configuration of the network path setting apparatus according to the embodiment.

As shown in FIG. 1, the network path setting apparatus according to the embodiment includes a network path management apparatus 1, a system management unit 2, a system management interface 3, and an ISA100.11a communication stack 4. The network path management apparatus 1 receives a user operation and displays various kinds of information relating to network paths. The system management unit 2 functions as a system manager as defined in the ISA100.11a standard. The system management interface 3 functions as a communication interface between the network path management apparatus 1 and the system management unit 2. The ISA100.11a communication stack 4 is disposed between a backbone router 5 and the system management unit 2.

As shown in FIG. 1, the network path management apparatus 1 includes a receiving module 11, an investigating module 12, and a registering module 13. The receiving module 11 receives input of wireless network paths. The investigating module 12 investigates a communication environment and status of each of routes constituting the wireless network paths that have been input through the receiving module 11. The registering module 13 registers the wireless network paths that have been input through the receiving module 11 as network paths to be used in the field wireless system if the communication environment and status of each route investigated by the investigating module 2 is appropriate.

As shown in FIG. 1, the backbone router 5 and field devices 6 constitute wireless communication network paths having a layered structure. The backbone router 5 is located at level 0 which is the highest layer, and the field devices 6 are located at levels 1, 2, . . . which are lower layers. As described later, positions, on the network paths, assigned to the individual devices are ones specified by the user.

Next, a description will be made of how the network path setting apparatus according to the embodiment operates.

Figure 2:
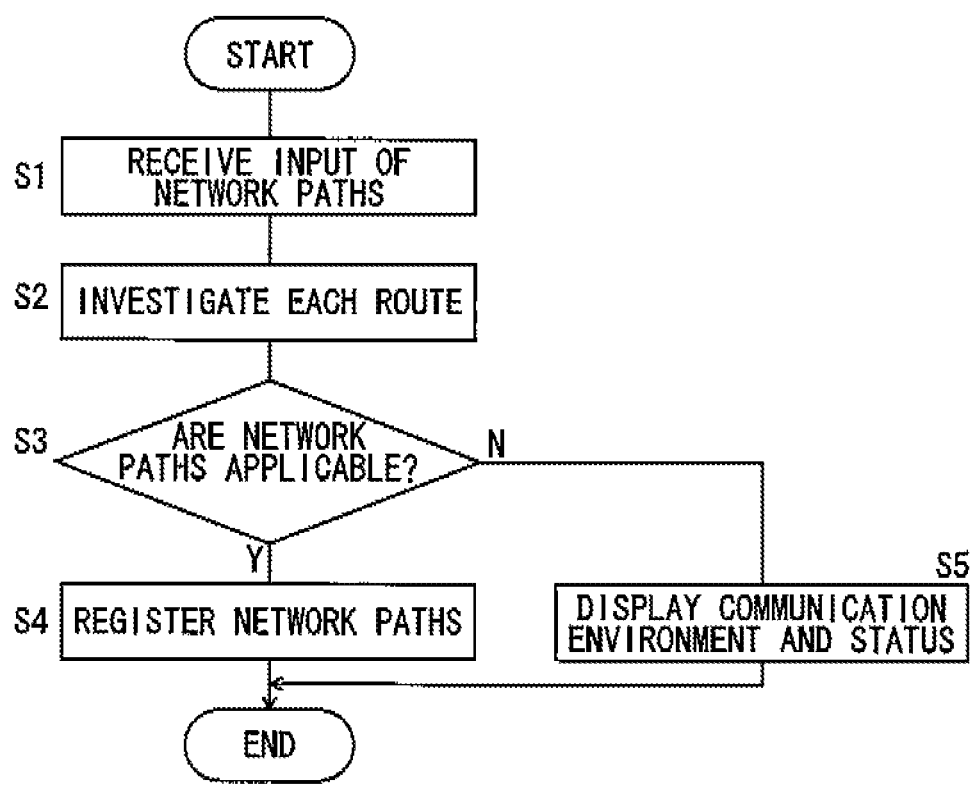
FIG. 2 is a flowchart showing of a process of operation which is executed by the network path setting apparatus according to the embodiment.

FIG. 2 is a flowchart of a process of operation which is executed by the network path setting apparatus according to the embodiment.

Referring to FIG. 2, at step S1, the network path management apparatus 1 receives network paths (network path topology) specified by the user via the receiving module 11. The positions of the backbone router 5 and the field devices 6 are determined uniquely by the network paths specified by the user.

At step S2, network path management apparatus 1 investigates a communication environment and status of each of routes constituting the network paths that were received at step S1, by the investigating module 12.

The investigating module 12 performs investigation on the basis of stored route information (see FIG. 1) which is indicating the communication environments and statues of the respective routes. The route information includes information relating to a communication environment and status of each route between the backbone router 5 and a field device 6 and each route between field devices 6. For example, the route information includes information indicating whether or not each route is provided with a communication function, that is, information indicating whether at least one communication device of each route is the backbone router 5 or a field device 6 having router capability. The route information also includes information indicating a distance between the two devices constituting each route and information indicating presence/absence of an obstruction between the two devices constituting each route. For example, these pieces of information may be either input by the user by operating the network path management apparatus 1 or acquired from a database or the like of the field wireless system.

The route information may include an actual communication environment and status of each route between the backbone router 5 and a field device 6 and each route between field devices 6. In this case, a communication environment and status represented by such parameters as communication possibility, radio wave intensity, and a communication loss ratio can be acquired by performing a trial communication along each route between the backbone router 5 and a field device 6 or each route between field devices 6 under the control of the system management unit 2. The communication loss ratio is a ratio of the number of communication frames (packets) that cannot reach a destination normally (or are lost during transmission) to the number of all packets. The acquired communication environments and statuses are transferred to the network path management apparatus 1 via the system management unit 2 and the system management interface 3 and stored there as route information. In this manner, actual communication environments and statuses can be acquired when network paths specified by the user have been received via the receiving module 11 of the network path management apparatus 1 (step S1), that is, they can be acquired by part of the processing executed at step S2. Actual communication environments and statuses can thus be acquired when network paths pave been input and used in the investigation performed by the investigating module 12.

At step S3, it is judged whether the network paths received at step S1 are applicable or not on the basis of results of the investigation performed at step S2. An affirmative judgment is made if the communication environment and status of every route between the backbone router 5 and a field device 6 and every route between field devices 6 is appropriate. For example, conditions for a judgment that the communication environment and status of a route is appropriate are that the distance between the two devices constituting the route is shorter than a certain distance, that no obstruction exists between the two devices, that the radio wave intensity of a communication between the two devices is higher than or equal to a certain value, or that the communication loss ratio is smaller than a certain value.

Figure 3:
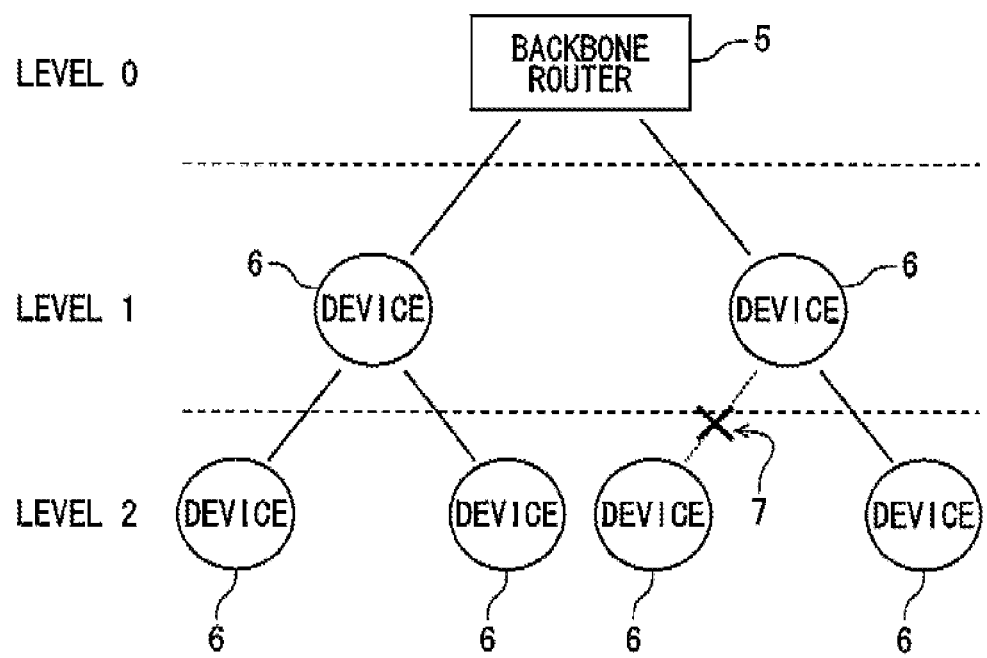
FIG. 3 shows example results of investigation performed by an investigating module 12.

FIG. 3 shows example results of the investigation performed by the investigating module 12. A negative judgment is made at step S3 if as shown in FIG. 3 a communication failure is found at a location 7 which is one of the routes constituting the input network paths. An affirmative judgment is made at step S3 if the communication environment and status of every route is good.

If an affirmative judgment is made at step S3, the process moves to step S4. On the other band, if a negative judgment is made at step S3, the process moves to step S5.

At step S4, the network paths that were input at step S1 are registered as route information. The process is thereafter finished. In this case, the registered network paths are transferred to the system management unit 2 via the system management interface 3 with proper timing and are employed as a topology of network paths that connect the backbone router 5 and the field devices 6 by the system management unit 2. In this manner, the network path topology as specified by the user can be realized.

On the other hand, at step S5, a communication environment(s) and status(es) are displayed on the network path management apparatus 1, The process is thereafter finished. At step S5, a route(s) having an inappropriate communication environment and status between devices is displayed. In this case, the network paths that were input at step S1 are neither registered as route information and nor employed as a topology of network paths that connect the backbone router 5 and the field devices 6.

At step S5, the communication environments and statuses of the individual routes may be displayed in such a manner that the network paths are display graphically and the communication environments and statuses of the individual routes are indicated there. For example, the communication environment and status of each route may be indicated by a line kind or a display color of a line representing the route. Alternatively, the communication environments and statuses of the individual routes constituting the network paths may be displayed in the form of a list.

As described above, in the-network path setting apparatus according to the embodiment, the user specifies network paths. If the communication environment and status of each route of the network paths has no problem, the user-specified network paths are employed as an actual network path topology. Therefore, a network path topology is determined uniquely and no trouble occurs in control even in the case where the network is used as a control loop. Furthermore, communication environments and statuses of network paths specified by the user are investigated, and the user-specified network paths are not constructed if an inappropriate communication environment and status is found. Therefore, occurrence of a communication abnormality in the network paths can be prevented.

The application range of the invention is not limited to the above embodiment. On the contrary, the invention can broadly be applied to network path setting apparatus etc. which set wireless network paths in a field wireless system.

While certain embodiments have been described, these embodiments have been presented by way of example only, and are not intended to limit the scope of the invention. Indeed, the novel apparatus and method described herein may be embodied in a variety of other forms; furthermore, various omissions, substitutions and changes in the form of the apparatus and method, described herein may be made without departing from the sprit of the invention. The accompanying claims and their equivalents are intended to cover such forms or modifications as would fall within the scope and sprit of the invention.

What is claimed is:

1. A wireless network path setting apparatus, for a wireless network having a control loop, comprising:
   a receiving module configured to receive input of wireless network paths;
   an investigating module configured to investigate a communication environment and status of each of routes constituting the wireless network paths that have been input through the receiving module; and
   a registering module configured to register the wireless network paths that have been input through the receiving module as network paths to be used in a field wireless system if the communication environment and status of each route investigated by the investigating module is appropriate,
   wherein the communication environment and status of a route, which has been input through the receiving module, are appropriate for registration as network paths when a distance between two devices constituting the route is shorter than a predetermined distance, when no obstruction exists between the two devices, when a radio wave intensity of a communication between the two devices is higher than or equal to a predetermined radio wave intensity value, or when a communication loss ratio is smaller than a predetermined communication loss ratio value,
   wherein the control loop of the wireless network uses a network path topology formed from registered network paths, the registered network paths being registered from the routes registered by the registering module, and
   wherein the network path topology is determined uniquely based on the communication environment and status of each route of the network paths.

2. The wireless network path setting apparatus according to claim 1, wherein the investigating module is configured to investigate the communication environment and status of each route on the basis of information stored in advance and indicating the communication environments and statuses of the respective routes.

3. The wireless network path setting apparatus according to claim 1, wherein the investigating module is configured to investigate the communication environment and status of each route on the basis of a result of a trial communication.

4. The wireless network path setting apparatus according to claim 1, wherein the wireless network paths has a layered structure.

5. A wireless network path setting method, for a wireless network comprising a control loop, comprising:
   receiving input of wireless network paths;
   investigating a communication environment and status of each of routes constituting the wireless network paths that have been input; and
   registering the wireless network paths that have been input as network paths to be used in a field wireless system if the communication environment and status of each route investigated is appropriate,
   wherein the communication environment and status of a route, which has been input through the receiving module, are appropriate for registration as network paths when a distance between two devices constituting the route is shorter than a predetermined distance, when no obstruction exists between the two devices, when a radio wave intensity of a communication between the two devices is higher than or equal to a predetermined radio wave intensity value, or when a communication loss ratio is smaller than a predetermined communication loss ratio value,
   wherein the control loop of the wireless network uses a network path topology formed from registered network paths, the registered network paths being registered from the routes registered by the registering module, and
   wherein the network path topology is determined uniquely based on the communication environment and status of each route of the network paths.

6. The wireless network path setting apparatus according to claim 1, wherein the network paths are display graphically and the communication environments and statuses of the individual routes are indicated graphically.

7. The wireless network path setting method according to claim 5, further comprising displaying the network paths graphically and indicating the communication environments and statuses of the individual routes graphically.

* * * * *